(12) United States Patent  (10) Patent No.: US 8,662,581 B1
Behbehani  (45) Date of Patent: Mar. 4, 2014

(54) PORTABLE ARMREST FOR SEATING

(71) Applicant: Mohammad Fawzi Qasem Behbehani, Salwa (KW)

(72) Inventor: Mohammad Fawzi Qasem Behbehani, Salwa (KW)

( * ) Notice: Subject to any disclaimer, the term of this patent is extended or adjusted under 35 U.S.C. 154(b) by 0 days.

(21) Appl. No.: 13/764,671

(22) Filed: Feb. 11, 2013

(51) Int. Cl.
*A47C 7/54* (2006.01)
*B60N 2/46* (2006.01)

(52) U.S. Cl.
USPC .............................. 297/188.18; 297/411.27

(58) Field of Classification Search
USPC ............... 297/411.27, 188.18, 188.2, 411.26, 297/411.28, 411.29; 248/311.2, 118, 118.3, 248/118.5, 226.11, 228.1
See application file for complete search history.

(56) References Cited

U.S. PATENT DOCUMENTS

| 2,659,423 | A |   | 11/1953 | Haley |            |
| 5,369,805 | A | * | 12/1994 | Bergsten et al. | 297/411.35 |
| 5,419,617 | A | * | 5/1995  | Schultz    | 297/411.27 |
| 5,542,743 | A | * | 8/1996  | Olson et al. | 297/353  |
| 5,553,923 | A | * | 9/1996  | Bilezikjian | 297/452.2 |
| 5,797,655 | A |   | 8/1998  | Miles      |            |
| 5,887,940 | A | * | 3/1999  | Anderson et al. | 297/135 |
| 5,967,345 | A |   | 10/1999 | Subotin    |            |
| 6,045,179 | A | * | 4/2000  | Harrison   | 297/188.2  |
| 6,050,644 | A |   | 4/2000  | Neal       |            |
| 6,311,939 | B1 | * | 11/2001 | Christensen | 248/118.3 |
| RE39,392  | E | * | 11/2006 | Bergin     | 248/311.2  |
| RE41,624  | E | * | 9/2010  | Bergin     | 248/311.2  |
| 8,272,686 | B1 |   | 9/2012  | Arnold     |            |
| 2003/0227208 | A1 |   | 12/2003 | Burwell et al. |        |
| 2008/0121774 | A1 | * | 5/2008 | Johnson    | 248/311.2  |
| 2009/0014611 | A1 |   | 1/2009  | Hampton    |            |

* cited by examiner

*Primary Examiner* — David R Dunn
*Assistant Examiner* — Timothy J Brindley
(74) *Attorney, Agent, or Firm* — Richard C. Litman

(57) ABSTRACT

The portable armrest for seating is removably attached to the lateral edge of the seating surface of an armless chair or the like. The device has a rigid upright with an arm support permanently and immovably affixed thereto, forming a symmetrical T-configuration. A clamp is removably attached to the lower end of the upright. The clamp is removably attached to the seating surface edge to secure the armrest removably thereto. Hand-manipulated fasteners are preferably used to secure the clamp to the seating surface, obviating need for tools. An accessory support flange extends from one side of the lower portion of the upright. An accessory (e.g., pencil box, tissue dispenser, etc.) may be secured to the upright by an elastic band, the bottom of the accessory resting upon the support flange. Optionally, a container having a wedge-shaped fitting extending therefrom may be secured within a complementary passage through the upright.

11 Claims, 6 Drawing Sheets

PORTABLE ARMREST FOR SEATING

BACKGROUND OF THE INVENTION

1. Field of the Invention

The present invention relates generally to portable accessories for furnishings, and particularly to a portable armrest for seating that may be secured to and removed from the lateral edge of the seating surface of an armless chair.

2. Description of the Related Art

Portable, economical seating has long been known and used in school classrooms, meeting halls, and other areas where rearrangement and/or removal of the seating is required from time to time. In many instances the chairs or seats are not provided with armrests, both for the sake of economy and also to facilitate their stacking with one another for compact storage. While such armrests are not required for the use of the chairs, some form of armrest would provide greater comfort for a person seated in the chair. This is of some benefit in an academic setting, as the more comfortable the student may be, the better he or she is able to pay attention to the presentation.

A number of removable accessories for chairs or other articles or devices have been developed in the past. Most are configured to hold some additional article, e.g., cup holders, ash trays, trash containers, etc. While such devices may provide additional comfort and/or utility for a person seated in the chair, for the most part they are unsuited for inclusion with a chair or seat in a classroom, lecture hall, meeting hall, or the like and they do nothing to comfortably support the arm or arms of a person seated in the chair.

Thus, a portable armrest for seating solving the aforementioned problems is desired.

SUMMARY OF THE INVENTION

The portable armrest for seating comprises an upright portion and a preferably padded arm support portion extending normal thereto. The upright and arm support portions are symmetrical and are permanently and immovably affixed to one another to form a generally T-shaped configuration. A clamp portion is removably attached to the base of the upright. The clamp is adapted for removable clamping to the lateral edge of a seating surface to secure the armrest removably thereto. The fasteners for attachment to the seating surface are preferably manipulated by hand, thereby obviating any need for tools for the attachment and removal of the armrest assembly to and from the chair.

An accessory support flange extends from one side or face of the upright near the lower end thereof, but above the clamp attachment. The accessory support flange serves to support the bottom of an accessory that is temporarily and removably attached to the upright of the armrest, e.g., a pencil box, a tissue box, a small trash container, etc. The accessory may be removably strapped to the upright of the armrest by an elastic band (e.g., rubber band), and is kept from slipping downward by the support flange therebeneath. An alternative accessory may include a fitting and flange extending therefrom and configured to wedge or seat within a hole or passage through the upright portion of the arm, thereby obviating need for additional attachment components such as elastic bands and the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The portable armrest for seating is a small, lightweight device that is quickly and easily attached to and removed from the seating surface of a lightweight and portable chair, stool, or similar article. The armrest significantly enhances the comfort of a person using the chair.

Figure 1:
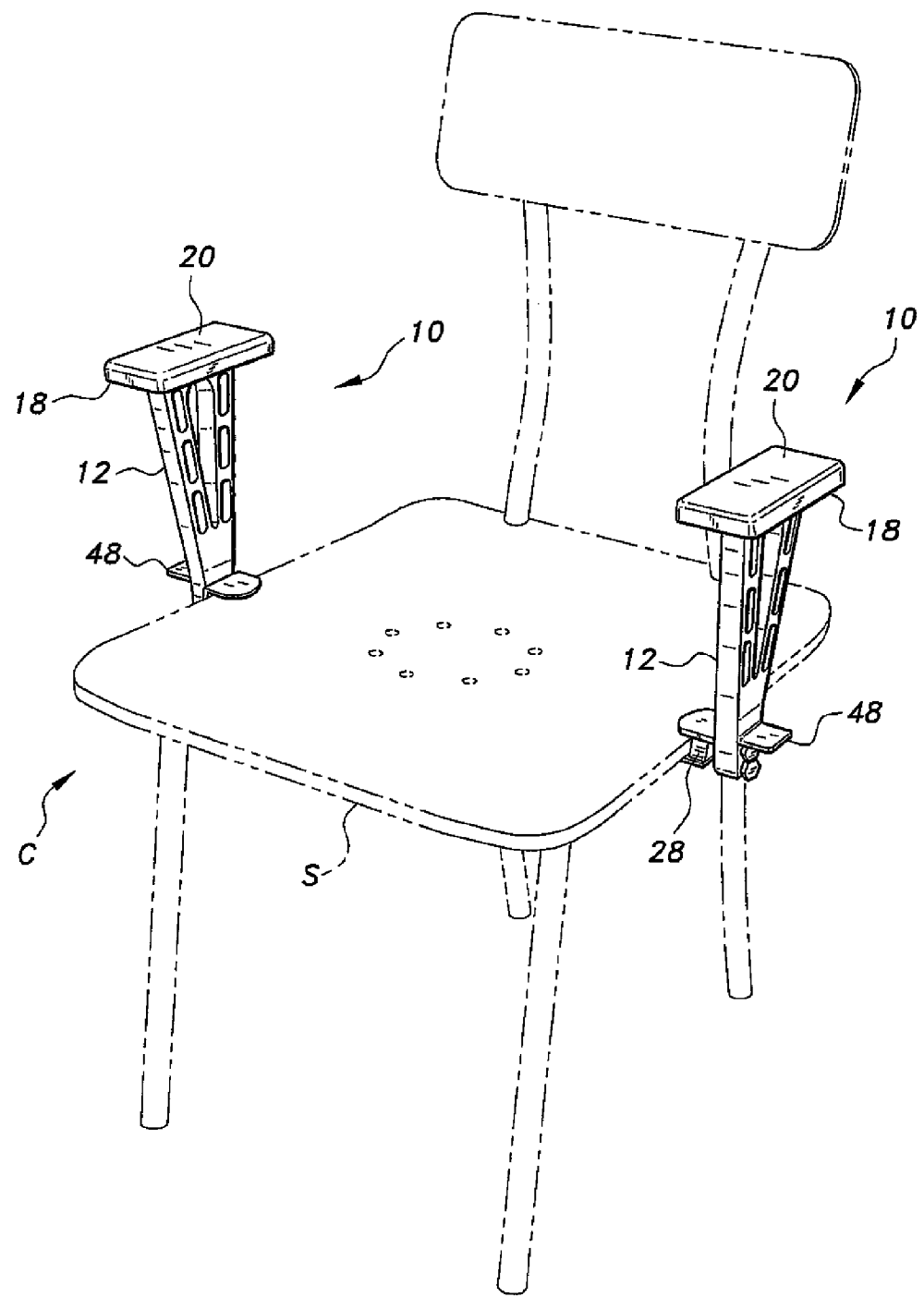
FIG. 1 is an environmental, perspective view of a chair having a pair of the portable armrests for seating according to the present invention attached thereto.
Figure 2:
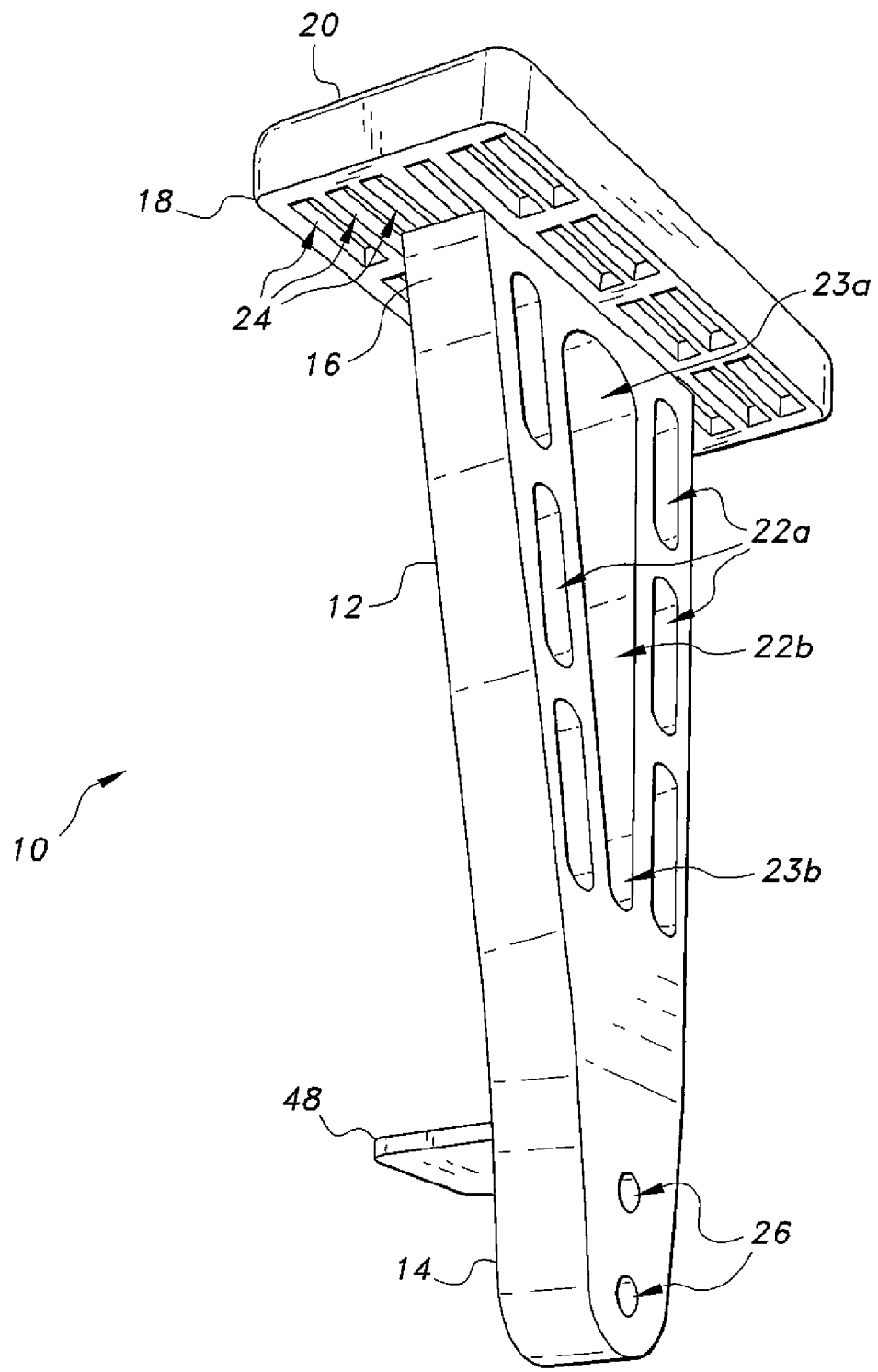
FIG. 2 is a perspective view of the upright and armrest portions of the portable armrest for seating according to the present invention, illustrating various features thereof.

FIG. 1 of the drawings is an environmental perspective view showing two of the portable armrests 10 installed upon laterally opposite edges of the seating surface S of a portable chair C. FIG. 2 provides a detailed perspective view of a single portable armrest unit 10 from the orientation of the armrest on the left side of FIG. 1. The portable armrest 10 includes an elongate upright portion 12 having a lower end 14 for attachment to the chair C, and an opposite upper end 16 to which an arm support portion 18 is attached. The upright 12 and arm support 18 are preferably formed as a unitary structure, e.g., permanently molded of plastic as a single unit, or formed by means of some other economical manufacture. At least the upper surface 20 of the arm support 18 is preferably padded for greater comfort of the user.

The upright 12 and arm support 18 collectively form a generally T-shaped configuration, with the upright 12 serving as the stem and the arm support 18 serving as the crossmember atop the stem. The portable armrest 10 has a symmetrical configuration on each side of the upright 12, i.e., to either end of the arm support 18. The arm support 18 is substantially normal to the upright 12. It will be seen that the upper end 16 of the upright 12 is somewhat wider than the opposite lower end 14 to provide greater strength and stability for the juncture of the arm support 18 to the upper end of the upright 12. Economy of manufacture and reduction of weight for ease of portability are provided by eliminating much of the material that would otherwise be used to form the armrest 10, by forming a series of lightening holes through the upright 12 and depressions 24 in the underside of the arm support 18. The holes comprise a number of smaller peripheral holes 22a and a single central elongate passage 22b between the smaller holes 22a. The elongate central passage 22b has a shape similar to that of the upright 12, i.e., tapered with a wider upper end 23a and narrower lower end 23b. The configuration of the central passage 22b may cooperate in the removable attachment of an accessory container to the portable armrest 10, as described in detail further below.

Figure 3:
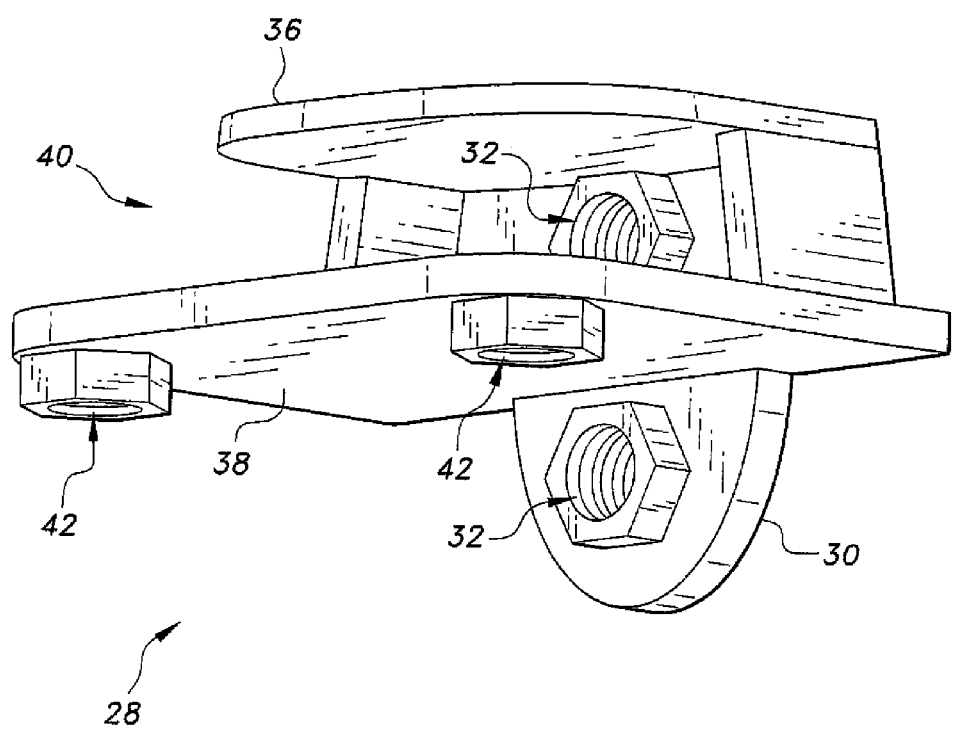
FIG. 3 is a perspective view of an attachment clamp for a portable armrest for seating according to the present invention, illustrating various features thereof.

Edge clamp attachment holes 26 are provided through the lower end portion 14 of the upright 12 for the removable attachment of a seating surface edge clamp 28 thereto. FIG. 3 of the drawings provides a detailed perspective view of a single seating surface edge clamp 28. The edge clamp 28 has a symmetrical structure for attachment to either side of the seating surface S of the chair C. The seating surface edge clamp 28 serves as a relatively small device to transfer all of the forces between the arm rest 10 and the seating surface S of the chair C, and is accordingly formed of a relatively durable material, such as steel or other suitable metal.

The edge clamp 28 includes an attachment plate 30 that allows the clamp 28 to be bolted to the lower end 14 of the upright, the attachment plate 30 preferably having two vertically spaced and threaded bolt holes 32 therein. A pair of suitable bolts 34 (shown in the assembly of FIG. 4) may be inserted through the edge clamp attachment holes 26 in the lower end 14 of the upright 12, and threaded into the corresponding bolt holes 32. The edge clamp 28 may be left permanently installed to the lower end 14 of the upright 12 in this manner, if desired, but the use of threaded bolts 34 enables the two components 12 and 28 to be disassembled from one another.

Figure 4:
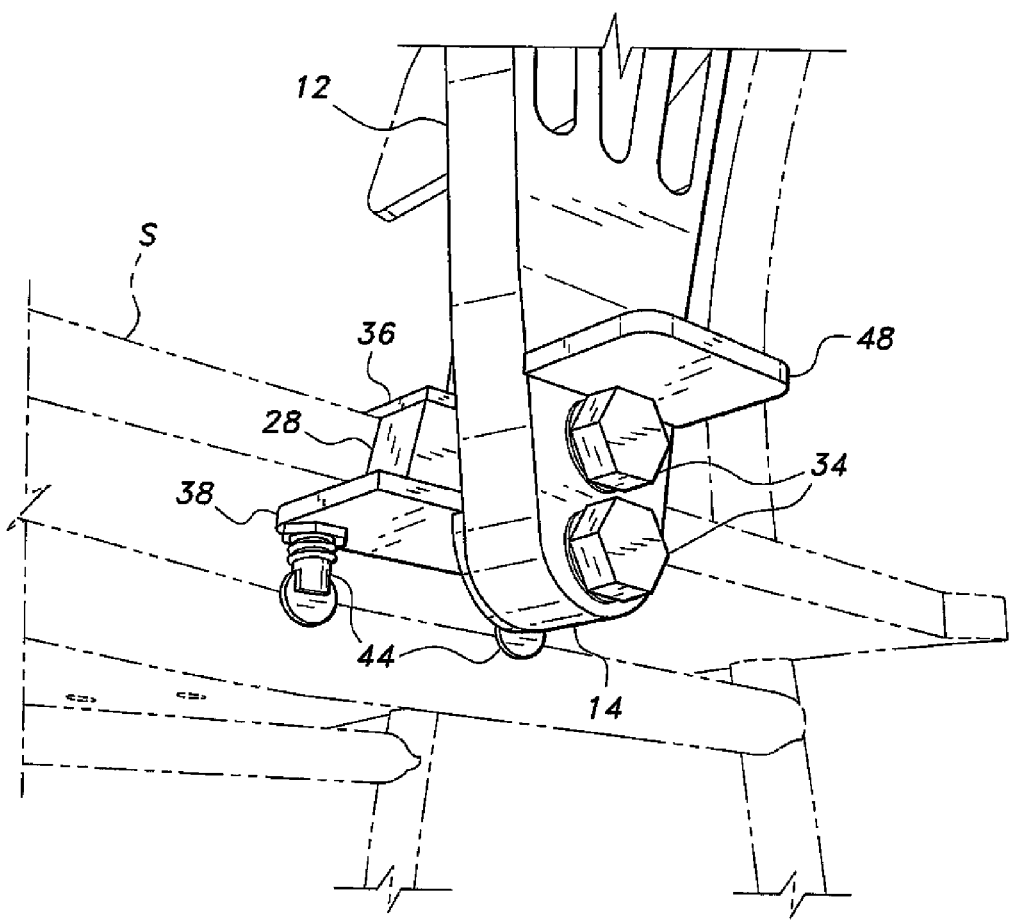
FIG. 4 is a partial perspective view of a portable armrest for seating according to the present invention, showing the lower end of the upright and the attachment clamp secured to the edge of the seating surface of an armless chair.

An upper plate 36 and a lower plate 38 extend from the attachment plate 30 of the edge clamp 28, with the two plates 36 and 38 being substantially parallel to one another and defining a seating surface attachment slot 40 therebetween. The lower plate 38 includes one or more (preferably two) threaded fastener passages 42 therethrough, enabling corresponding threaded fasteners (e.g., winged headed bolts or screws 44, as shown in FIG. 4) to be installed therein. The edge clamp 28 is secured to the edge of the seating surface S by placing the attachment slot 40 over the edge of the chair to sandwich the seating surface edge between the two plates 36 and 38. The two winged bolts 44 are then tightened in their holes 42 to grip the edge of the seating surface S between the upper plate 36 and the bolts 44, as shown in FIGS. 1 and 4 of the drawings. The provision of wing bolts 44 enables the seating surface edge clamp 28 to be installed upon and removed from the edge of the seating surface S by hand, i.e., without need of any tools.

Figure 5:
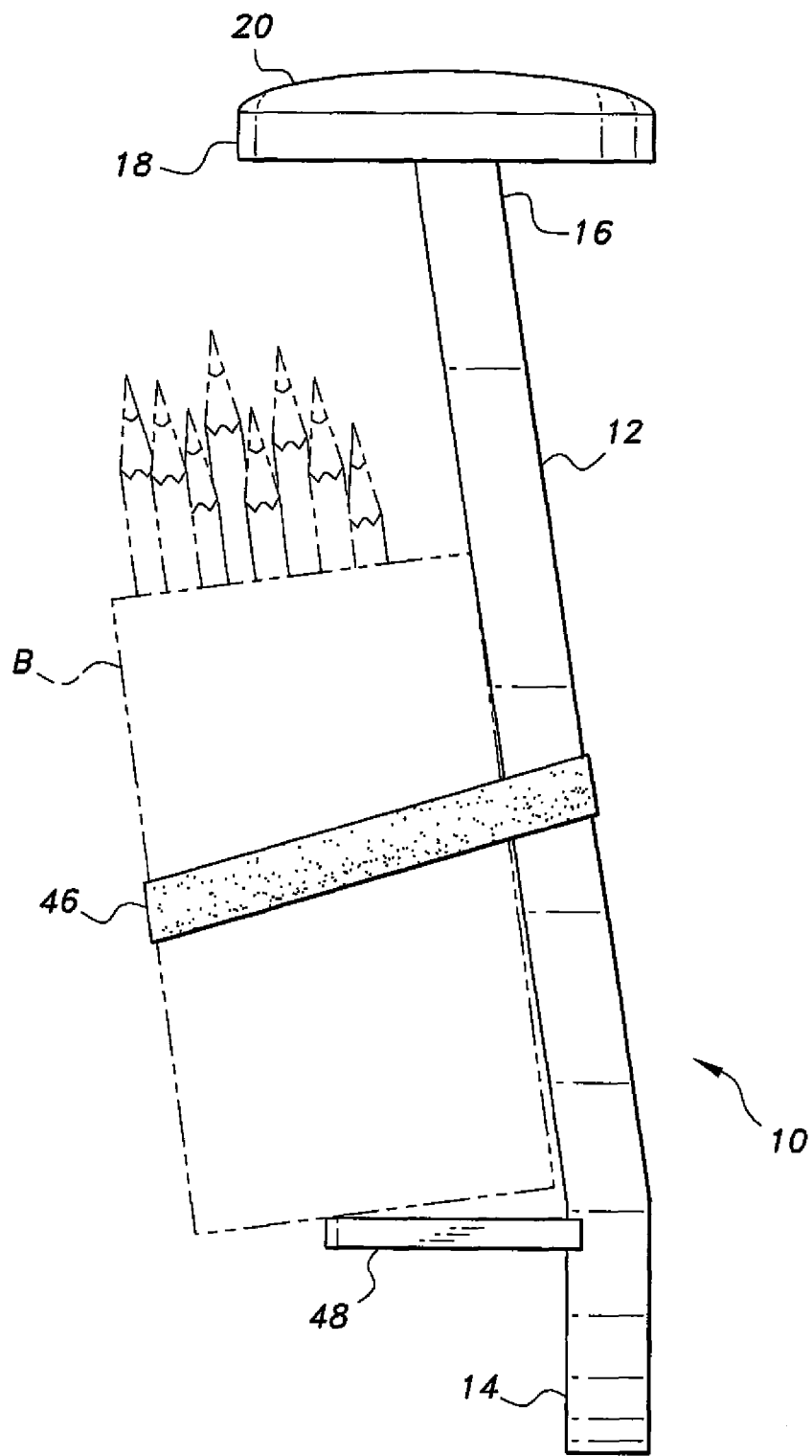
FIG. 5 is an elevation view of a portable armrest for seating according to the present invention, showing attachment of an accessory container to the upright.

FIG. 5 is an illustration of the use of the portable armrest 10 for the temporary and removable attachment of another article or accessory thereto. A resilient band 46, e.g., a rubber band, an elastic hair band, etc., is placed generally medially about the upright portion 12 of the armrest 10 prior to installing the armrest on the seating surface S. The band 46 serves to retain an accessory article of some sort, e.g., a pencil box B, a tissue container, cup holder, trash container, etc., upon the upright 12. The pencil box B or other accessory is oriented opposite the seating surface S to provide the seated person with more seating room. The box B or other accessory is prevented from slipping downward from the upright 12 by an accessory support ledge 48 extending from the upright 12 adjacent the lower end 14 thereof and substantially normal thereto, as shown in FIGS. 1, 2, 4, and 5. The accessory support ledge 48 is preferably molded or otherwise formed as an integral component of the portable armrest 10 at the time of manufacture.

Figure 6:
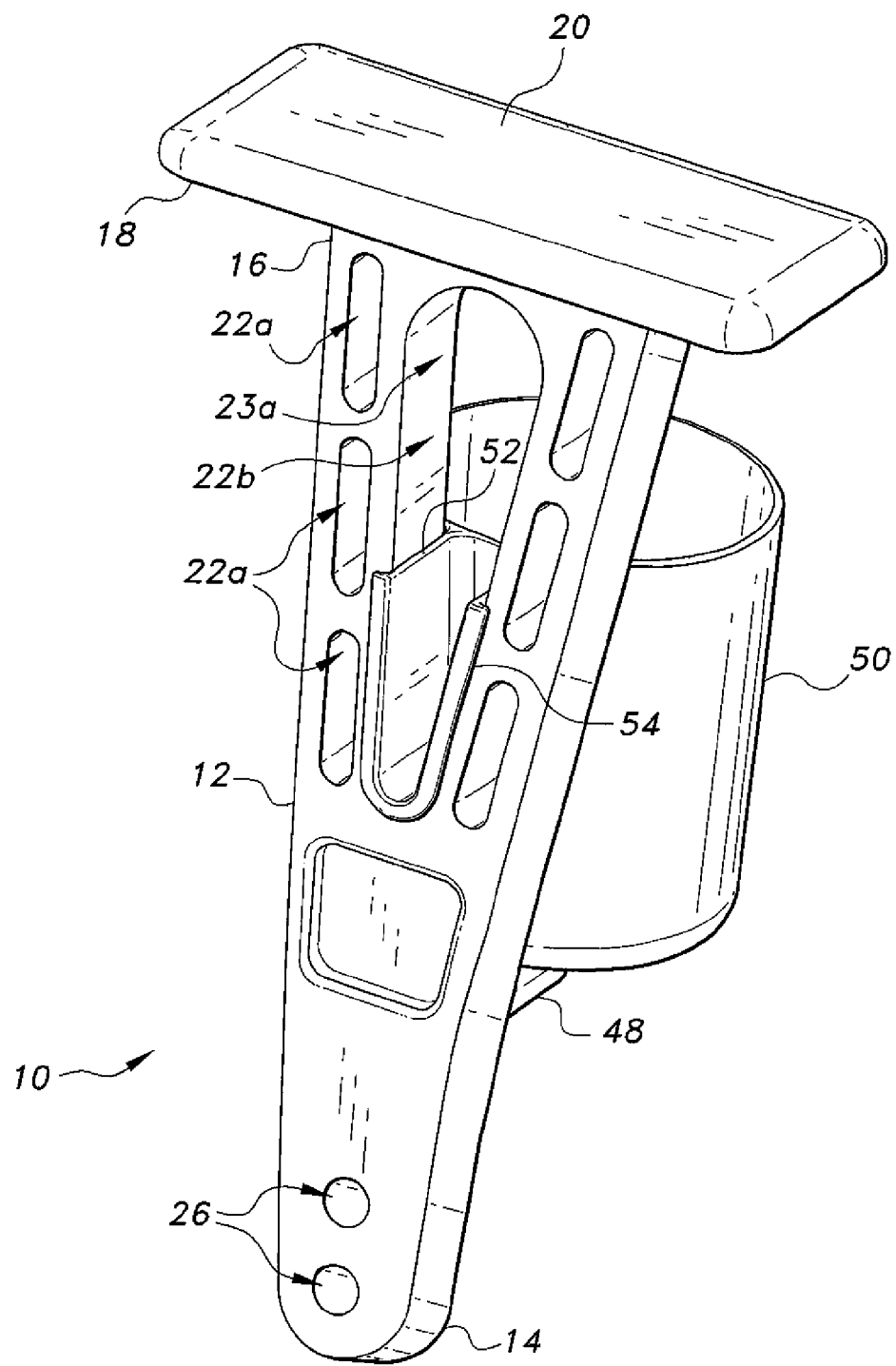
FIG. 6 is a perspective view of a portable armrest for seating according to the present invention, showing an optional accessory attached to the armrest.

FIG. 6 provides an illustration of an alternative accessory attachment system, wherein the accessory 50 (e.g., a cup or other container) has a wedge-shaped fitting 52 extending therefrom. The fitting 52 is narrower at its lower end than at its upper end, and is configured to wedge into the narrower lower portion 23b (shown in FIG. 2) of the central passage 22b through the upright 12 of the armrest 10. The fitting 52 includes an outwardly oriented flange or lip 54 extending therefrom to grip the lower edge of the central hole or passage 22b to prevent the fitting 52 from pulling directly out from its seated position in the lower portion 23b of the central hole or passage 22b. The accessory container 50 is attached to the portable armrest 10 by inserting the fitting 52 through the wider portion of the central hole or passage 22b above its narrower lower end 23b, and lowering the container 50 and its fitting 52 until the fitting is seated in the lower end 23b of the passage 22b with the flange 54 gripping the opposite face of the upright 12. Removal of the accessory 50 is accomplished by reversing the above procedure. The fitting 52 may be made from a material having sufficient resilience so that the flanges or lips 54 on the edges of the V-shaped fitting 52 are resiliently biased to engage the edges of the central passage 22b to prevent the accessory 50 from inadvertently slipping or falling out of the passage 22b. Although the accessory support ledge 48 is shown in FIG. 6, it will be appreciated that the downward travel of the accessory 50 is limited so that the support ledge 48 is not needed to support the accessory 50 due to the wedge action of the fitting 52 in the passage 22b.

Accordingly, the portable armrest 10 provides a quick, simple, and economical means for a person to greatly enhance the comfort of simple portable seating. While the device is shown removably attached to the lateral edge of the seating surface S of a chair C, it will be seen that it may be secured to the edge of any suitable surface, e.g., a wooden board, wood, plastic, or metal bench or bleacher seating, etc., to enhance the comfort of a person seated thereon. The adjustable attachment of the device to the edge of the seating surface further allows the user to position the armrest 10 forward or rearward along the lateral edge of the seating surface for optimum comfort for the user. The portable armrest 10 may be quickly and easily removed when the person using the device is ready to depart, thus enabling the person to reuse the armrest 10 at any time in the future that he or she has need of an armrest on an otherwise unequipped seating surface.

It is to be understood that the present invention is not limited to the embodiments described above, but encompasses any and all embodiments within the scope of the following claims.

I claim:

1. A portable armrest for seating, comprising:
   an elongate upright having a lower end and an upper end opposite the lower end;
   a padded arm support permanently and immovably affixed to the upper end of the upright; and
   a seating surface edge clamp removably affixed to the lower end of the upright;
   wherein the upright has an elongate central passage defined therein, the passage having an upper end and a lower end narrower than the upper end; and
   a container having a wedge-shaped fitting extending therefrom, the fitting having an outwardly disposed flange extending therefrom, the fitting being configured for being removably wedged within the lower end of the central passage of the upright in order to removably secure the container to the upright.

2. The portable armrest for seating according to claim 1 wherein the seating surface edge clamp has:
   an upper plate and a lower plate parallel to the upper plate, the upper plate and the lower plate defining a seating surface attachment slot therebetween, the lower plate having at least one threaded fastener passage disposed therethrough; and a wing bolt engaging the at least one threaded fastener passage.

3. The portable armrest for seating according to claim 1 wherein the arm support is substantially normal to the upright, the upright and the arm support forming a substantially symmetrical T-shaped configuration.

4. The portable armrest for seating according to claim 1 further comprising:
   an accessory support ledge extending from the upright adjacent the lower end thereof and substantially normal thereto; and
   a resilient accessory attachment band removably disposed about the upright.

5. The portable armrest for seating according to claim 1, wherein the upper end of the upright is wider than the lower end.

6. The portable armrest for seating according to claim 1, wherein:
   the upright has a plurality of holes defined therein for reducing weight;
   the arm support has a lower surface having a plurality of depressions defined therein for reducing weight; and
   the upright and the arm support are formed of plastic as a single monolithic unit.

7. A portable armrest for seating, comprising:
   an elongate upright having a lower end and an upper end opposite the lower end;
   an arm support permanently disposed upon the upper end of the upright, the arm support being generally normal to the upright, the upright and the arm support forming a substantially symmetrical, T-shaped configuration; and
   a seating surface edge clamp removably affixed to the lower end of the upright;
   wherein the upper end of the upright is wider than the lower end, the upright having an elongate central passage defined therein, the passage having an upper end and a lower end narrower than the upper end; and
   a container having a wedge-shaped fitting extending therefrom, the fitting having an outwardly disposed flange extending therefrom, the fitting being configured for being removably wedged within the lower end of the central passage of the upright in order to removably secure the container to the upright.

8. The portable armrest for seating according to claim 7, further comprising a padded upper surface disposed upon the arm support.

9. The portable armrest for seating according to claim 7, wherein the seating surface edge clamp has:
   an upper plate and a lower plate parallel to the upper plate, the upper plate and the lower plate defining a seating surface attachment slot therebetween, the lower plate having at least one threaded fastener passage disposed therethrough; and
   a wing bolt engaging the at least one threaded fastener passage.

10. The portable armrest for seating according to claim 7, further comprising:
    a resilient accessory attachment band removably disposed about the upright; and
    an accessory support ledge extending from the upright adjacent the lower end thereof and substantially normal thereto.

11. The portable armrest for seating according to claim 7, wherein:
    the upright has a plurality of holes defined therein for reducing weight;
    the arm support has a lower surface having a plurality of depressions defined therein for reducing weight; and
    the upright and the arm support are formed of plastic as a single monolithic unit.

\* \* \* \* \*